(12) United States Patent
Krichtafovitch

(10) Patent No.: US 10,875,034 B2
(45) Date of Patent: Dec. 29, 2020

(54) ELECTROSTATIC PRECIPITATOR

(71) Applicant: Pacific Air Filtration Holdings, LLC, Boulder, CO (US)

(72) Inventor: Igor Krichtafovitch, Kiev (UA)

(73) Assignee: Agentis Air LLC, Columbia, MD (US)

( * ) Notice: Subject to any disclaimer, the term of this patent is extended or adjusted under 35 U.S.C. 154(b) by 0 days.

(21) Appl. No.: 16/219,744

(22) Filed: Dec. 13, 2018

(65) Prior Publication Data

US 2020/0188932 A1 Jun. 18, 2020

(51) Int. Cl.
*B03C 3/68* (2006.01)
*F24F 3/16* (2006.01)
*B03C 3/12* (2006.01)
*B03C 3/36* (2006.01)
*B03C 3/47* (2006.01)
*B03C 3/08* (2006.01)

(52) U.S. Cl.
CPC ............... *B03C 3/68* (2013.01); *B03C 3/08* (2013.01); *B03C 3/12* (2013.01); *B03C 3/36* (2013.01); *B03C 3/47* (2013.01); *F24F 3/166* (2013.01)

(58) Field of Classification Search
CPC combination set(s) only.
See application file for complete search history.

(56) References Cited

U.S. PATENT DOCUMENTS

| 1,650,097 | A | 11/1927 | Schmidt |
| 1,931,436 | A | 10/1933 | Walther |
| 1,957,560 | A | 5/1934 | Thompson |
| 2,142,129 | A | 1/1939 | Wilhelm et al. |
| 2,271,597 | A | 2/1942 | Lionel |
| 2,526,402 | A | 10/1950 | Palmer |
| 2,771,963 | A | 11/1956 | Warren |
| 2,997,130 | A | 8/1961 | Nodolf |
| 3,040,497 | A | 6/1962 | Schwab |
| 3,157,479 | A | 11/1964 | Boles |
| 3,452,225 | A * | 6/1969 | Gourdine .......... H02N 3/00 310/11 |
| 3,504,482 | A | 4/1970 | Goettl |

(Continued)

FOREIGN PATENT DOCUMENTS

| CN | 2319732 | 5/1999 |
| CN | 1926651 A | 3/2007 |

(Continued)

OTHER PUBLICATIONS

Wen, T.-Y., Wang, H., Krichtofovich, I., Mamishev, A., Novel Electrodes of an Electrostatic Precipitator for Air Filtration, submitted to Journal of Electronics Nov. 12, 2014, Journal of Electrostatics, 73 (2015), pp. 117-124. (Year: 2014).*

(Continued)

*Primary Examiner* — Christopher P Jones
*Assistant Examiner* — Sonji Turner
(74) *Attorney, Agent, or Firm* — Ungerman IP PLLC; Mark E. Ungerman

(57) ABSTRACT

An electrostatic air cleaner may be operated according to a manner designed to achieve acceptable air quality while balancing power usage and corona electrode degradation levels. The voltage applied to the corona electrode(s) may be controlled as well as the voltage applied to repelling electrodes and air flow velocity. The air cleaner may also be operated to achieve desired particle separation.

14 Claims, 2 Drawing Sheets

(56) References Cited

U.S. PATENT DOCUMENTS

| | | | |
|---|---|---|---|
| 3,518,462 | A | 6/1970 | Brown |
| 3,710,588 | A | 1/1973 | Martinez |
| 3,751,715 | A * | 8/1973 | Edwards ................ H01T 23/00 |
| | | | 361/230 |
| 3,816,980 | A | 6/1974 | Schwab |
| 3,831,351 | A | 8/1974 | Gibbs et al. |
| 3,959,715 | A | 5/1976 | Canning |
| 3,960,505 | A | 6/1976 | Marks |
| 4,057,405 | A | 11/1977 | Cheney et al. |
| 4,077,785 | A | 3/1978 | Hartshorn |
| 4,098,591 | A | 7/1978 | Diepenbroek et al. |
| 4,124,359 | A | 11/1978 | Geller |
| 4,160,202 | A | 7/1979 | James et al. |
| 4,166,729 | A | 9/1979 | Thompson et al. |
| 4,177,047 | A | 12/1979 | Goland |
| 4,178,156 | A | 12/1979 | Tashiro et al. |
| 4,231,766 | A | 11/1980 | Spurgin |
| 4,246,010 | A | 1/1981 | Honacker |
| 4,259,093 | A | 3/1981 | Vlastos et al. |
| 4,259,707 | A | 3/1981 | Penney |
| 4,264,343 | A | 4/1981 | Natarajan et al. |
| 4,290,003 | A | 9/1981 | Lanese |
| 4,390,830 | A | 6/1983 | Laugesen |
| 4,390,831 | A | 6/1983 | Byrd et al. |
| 4,433,281 | A | 2/1984 | Herklotz et al. |
| 4,486,704 | A | 12/1984 | Gustafsson et al. |
| 4,490,159 | A | 12/1984 | Malts |
| 4,516,991 | A | 5/1985 | Kawashima |
| 4,549,887 | A | 10/1985 | Joannou |
| 4,604,112 | A | 8/1986 | Ciliberti et al. |
| 4,613,346 | A | 9/1986 | Reyes et al. |
| 4,643,745 | A * | 2/1987 | Sakakibara ............... B03C 3/12 |
| | | | 96/76 |
| 4,673,416 | A | 6/1987 | Sakakibara et al. |
| 4,689,056 | A | 8/1987 | Noguchi et al. |
| 4,719,535 | A | 1/1988 | Zhenjun et al. |
| 4,789,801 | A * | 12/1988 | Lee ........................... B03C 3/38 |
| | | | 310/308 |
| 4,904,283 | A | 2/1990 | Hovis et al. |
| 4,980,796 | A | 12/1990 | Huggins |
| 5,035,728 | A | 7/1991 | Fang |
| 5,055,118 | A * | 10/1991 | Nagoshi ..................... B03C 3/08 |
| | | | 96/77 |
| 5,068,811 | A | 11/1991 | Johnston et al. |
| 5,108,470 | A | 4/1992 | Pick |
| 5,123,524 | A | 6/1992 | Lapeyre |
| 5,251,171 | A | 10/1993 | Yamauchi |
| 5,254,155 | A | 10/1993 | Mensi |
| 5,330,559 | A | 7/1994 | Cheney et al. |
| 5,332,485 | A | 7/1994 | Thompson |
| 5,332,562 | A | 7/1994 | Kersey et al. |
| 5,336,299 | A | 8/1994 | Savell |
| 5,395,430 | A | 3/1995 | Lundgren et al. |
| 5,466,279 | A | 11/1995 | Hattori et al. |
| 5,526,402 | A | 6/1996 | Dent et al. |
| 5,573,577 | A | 11/1996 | Joannou |
| 5,628,818 | A | 5/1997 | Smith et al. |
| 5,679,121 | A | 10/1997 | Kim |
| 5,689,177 | A | 11/1997 | Nielsen et al. |
| 5,707,428 | A | 1/1998 | Feldman et al. |
| 5,807,425 | A | 9/1998 | Gibbs |
| 5,827,407 | A | 10/1998 | Wang et al. |
| 5,846,302 | A | 12/1998 | Putro |
| 5,914,454 | A | 6/1999 | Imbaro et al. |
| 5,922,111 | A | 7/1999 | Omi et al. |
| 5,993,521 | A | 11/1999 | Loreth et al. |
| 6,129,781 | A | 10/2000 | Okamoto et al. |
| 6,187,271 | B1 | 2/2001 | Lee et al. |
| 6,245,131 | B1 | 6/2001 | Rippelmeyer et al. |
| 6,251,171 | B1 | 6/2001 | Marra et al. |
| 6,504,308 | B1 | 1/2003 | Krichtafovitch et al. |
| 6,527,834 | B1 | 3/2003 | Jörder et al. |
| 6,635,106 | B2 | 10/2003 | Katou et al. |
| 6,656,248 | B2 | 12/2003 | Ilmasti |
| 6,660,061 | B2 | 12/2003 | Josephson et al. |
| 6,764,533 | B2 | 7/2004 | Lobiondo |
| 6,790,259 | B2 | 9/2004 | Rittri et al. |
| 6,805,732 | B1 | 10/2004 | Billiotte et al. |
| 6,831,271 | B1 | 12/2004 | Guevremont et al. |
| 6,888,314 | B2 | 5/2005 | Krichtafovitch et al. |
| 6,937,455 | B2 | 8/2005 | Krichtafovitch et al. |
| 6,984,987 | B2 | 1/2006 | Taylor et al. |
| 7,008,469 | B2 | 3/2006 | Vetter et al. |
| 7,019,244 | B2 * | 3/2006 | Weaver ..................... B03C 3/08 |
| | | | 209/127.1 |
| 7,048,780 | B2 | 5/2006 | Kim et al. |
| 7,112,238 | B2 | 9/2006 | Joannou |
| 7,150,780 | B2 * | 12/2006 | Krichtafovitch .......... B03C 3/08 |
| | | | 96/72 |
| 7,163,572 | B1 | 1/2007 | Liang et al. |
| 7,182,805 | B2 | 2/2007 | Reaves |
| 7,264,659 | B2 | 9/2007 | Moshenrose |
| 7,316,735 | B2 | 1/2008 | Tomimatsu et al. |
| 7,332,019 | B2 | 2/2008 | Bias et al. |
| 7,351,274 | B2 | 4/2008 | Helt et al. |
| 7,393,385 | B1 | 7/2008 | Coffey et al. |
| 7,405,672 | B2 * | 7/2008 | Taylor ..................... C01B 13/10 |
| | | | 340/629 |
| 7,431,755 | B2 | 10/2008 | Kobayashi et al. |
| 7,438,743 | B2 | 10/2008 | Strauss |
| 7,452,410 | B2 | 11/2008 | Bergeron et al. |
| 7,513,933 | B2 | 4/2009 | Coppom et al. |
| 7,531,027 | B2 | 5/2009 | Tepper et al. |
| 7,531,028 | B2 | 5/2009 | Mello et al. |
| 7,534,288 | B2 | 5/2009 | Bromberg |
| 7,553,353 | B2 | 6/2009 | Lepage |
| 7,569,100 | B2 | 8/2009 | Tanaka et al. |
| 7,582,144 | B2 | 9/2009 | Krigmont |
| 7,582,145 | B2 | 9/2009 | Krigmont |
| 7,594,958 | B2 | 9/2009 | Krichtafovitch et al. |
| 7,597,750 | B1 | 10/2009 | Krigmont |
| 7,608,135 | B2 | 10/2009 | Mello et al. |
| 7,652,431 | B2 | 1/2010 | Krichtafovitch |
| 7,717,980 | B2 | 5/2010 | Tepper et al. |
| 7,736,418 | B2 | 6/2010 | Graß |
| 7,753,994 | B2 | 7/2010 | Motegi et al. |
| 7,758,675 | B2 | 7/2010 | Naito et al. |
| 7,780,761 | B2 | 8/2010 | Gu et al. |
| 7,815,719 | B2 | 10/2010 | McKinney et al. |
| 7,833,322 | B2 | 11/2010 | Botvinnik et al. |
| 7,857,884 | B2 * | 12/2010 | Bohlen ............... B01D 46/0043 |
| | | | 55/471 |
| 7,857,890 | B2 | 12/2010 | Paterson et al. |
| 7,896,957 | B2 | 3/2011 | Zhao et al. |
| 7,914,604 | B2 | 3/2011 | Mello et al. |
| 7,942,952 | B2 | 5/2011 | Gale |
| 7,998,255 | B2 | 8/2011 | Blum |
| 8,043,412 | B2 | 10/2011 | Carlson |
| 8,049,426 | B2 * | 11/2011 | Krichtafovitch ......... H01J 49/04 |
| | | | 250/423 R |
| 8,092,768 | B2 | 1/2012 | Miller et al. |
| 8,211,208 | B2 | 7/2012 | Chan et al. |
| 8,241,396 | B2 | 8/2012 | Ursem et al. |
| 8,241,397 | B2 | 8/2012 | Gu et al. |
| 8,277,541 | B2 | 10/2012 | Hunt et al. |
| 8,278,797 | B2 | 10/2012 | Sashida |
| 8,349,052 | B2 | 1/2013 | Noh et al. |
| 8,357,233 | B2 | 1/2013 | Chan |
| 8,366,813 | B2 | 2/2013 | Tokuda et al. |
| 8,388,900 | B2 | 3/2013 | Benedek et al. |
| 8,404,020 | B2 | 3/2013 | Farmer et al. |
| 8,414,687 | B2 | 4/2013 | Li |
| 8,454,733 | B2 | 6/2013 | Tanaka et al. |
| 8,460,433 | B2 | 6/2013 | Gefter et al. |
| 8,492,733 | B1 | 7/2013 | Klochkov et al. |
| 8,506,674 | B1 | 8/2013 | Brown-Fitzpatrick et al. |
| 8,551,228 | B2 | 10/2013 | Chan |
| 8,574,345 | B2 | 11/2013 | Ursem et al. |
| 8,597,415 | B2 | 12/2013 | Noh et al. |
| 8,608,826 | B2 | 12/2013 | Al-Hamouz |
| 8,608,838 | B2 | 12/2013 | Wong et al. |
| 8,623,116 | B2 * | 1/2014 | Karlsson ................... B03C 3/68 |
| | | | 95/4 |
| 8,624,476 | B2 | 1/2014 | Sekoguchi |

(56) References Cited

U.S. PATENT DOCUMENTS

| | | | |
|---|---|---|---|
| 8,663,362 B2 | 3/2014 | Hagan | |
| 8,690,996 B2 | 4/2014 | Ji et al. | |
| 8,702,848 B2 | 4/2014 | Kulprathipanja et al. | |
| 8,721,775 B2 | 5/2014 | Chesebrough | |
| 8,736,043 B2 | 5/2014 | Konno et al. | |
| 8,741,018 B2 | 6/2014 | Belcher et al. | |
| 8,760,830 B2 | 6/2014 | Ikeda | |
| 8,845,782 B2 | 9/2014 | Metteer | |
| 8,873,215 B2 | 10/2014 | Waddell | |
| 8,889,079 B2 | 11/2014 | Zahedi | |
| 8,920,537 B2 | 12/2014 | Seike | |
| 8,999,040 B2 * | 4/2015 | Johansson | B03C 3/763 95/76 |
| 9,028,588 B2 | 5/2015 | Hess | |
| 9,089,849 B2 | 7/2015 | Gu et al. | |
| 9,216,233 B2 | 12/2015 | Ota et al. | |
| 9,308,537 B2 | 4/2016 | Krichtafovitch | |
| 9,308,538 B2 | 4/2016 | Genereux et al. | |
| 9,327,293 B2 | 5/2016 | McKinney et al. | |
| 9,387,487 B2 | 7/2016 | McGrath | |
| 9,441,845 B2 | 9/2016 | Waddell | |
| 9,453,651 B2 * | 9/2016 | Park | F24F 7/007 |
| 9,457,118 B2 | 10/2016 | Ota et al. | |
| 9,488,382 B2 * | 11/2016 | Krichtafovitch | B03C 3/08 |
| 9,550,189 B2 * | 1/2017 | Oertmann | B03C 3/09 |
| 9,630,186 B2 * | 4/2017 | Back | B03C 3/41 |
| 9,797,864 B2 | 10/2017 | McKinney | |
| 2002/0134932 A1 | 9/2002 | Guevremont et al. | |
| 2002/0152890 A1 | 10/2002 | Leiser | |
| 2002/0190658 A1 | 12/2002 | Lee | |
| 2003/0005824 A1 | 1/2003 | Katou et al. | |
| 2003/0131727 A1 | 7/2003 | Fissan et al. | |
| 2004/0023411 A1 | 2/2004 | Fenn | |
| 2004/0105802 A1 | 6/2004 | Duncan et al. | |
| 2004/0212329 A1 * | 10/2004 | Krichtafovitch | H05H 1/48 315/500 |
| 2006/0177356 A1 * | 8/2006 | Miller | A61L 9/16 422/121 |
| 2006/0185511 A1 | 8/2006 | Tepper | |
| 2006/0278074 A1 * | 12/2006 | Tseng | B03C 3/32 95/57 |
| 2006/0278082 A1 | 12/2006 | Tomimatsu et al. | |
| 2006/0286017 A1 | 12/2006 | Hakka | |
| 2007/0148061 A1 | 6/2007 | Lau et al. | |
| 2008/0030920 A1 * | 2/2008 | Krichtafovitch | B03C 3/08 361/233 |
| 2008/0092743 A1 | 4/2008 | Taylor et al. | |
| 2008/0121106 A1 | 5/2008 | Tepper et al. | |
| 2008/0282772 A1 | 11/2008 | Petinarides | |
| 2009/0114090 A1 | 5/2009 | Gu et al. | |
| 2009/0235817 A1 | 9/2009 | Gu et al. | |
| 2009/0235821 A1 | 9/2009 | Mochizuki et al. | |
| 2009/0320426 A1 | 12/2009 | Braunecker et al. | |
| 2010/0051709 A1 * | 3/2010 | Krichtafovitch | B03C 3/08 236/36 |
| 2010/0089240 A1 * | 4/2010 | Krichtafovitch | B03C 3/368 96/32 |
| 2010/0095848 A1 | 4/2010 | Chang et al. | |
| 2010/0155025 A1 * | 6/2010 | Jewell-Larsen | F28F 13/16 165/96 |
| 2010/0229724 A1 | 9/2010 | Tokuda et al. | |
| 2010/0243885 A1 | 9/2010 | Tepper et al. | |
| 2011/0084611 A1 | 4/2011 | Schlitz et al. | |
| 2011/0286892 A1 | 11/2011 | Taylor et al. | |
| 2012/0073436 A1 | 3/2012 | Li | |
| 2013/0021715 A1 * | 1/2013 | Jewell-Larsen | B03C 3/743 361/225 |
| 2013/0047857 A1 | 2/2013 | Bohlen | |
| 2013/0047858 A1 | 2/2013 | Bohlen et al. | |
| 2013/0047859 A1 | 2/2013 | Bohlen | |
| 2013/0074690 A1 | 3/2013 | Tomimatsu et al. | |
| 2013/0220128 A1 | 8/2013 | Gu et al. | |
| 2013/0284025 A1 | 10/2013 | Johansson et al. | |
| 2014/0150659 A1 | 6/2014 | McGrath | |
| 2014/0174294 A1 | 6/2014 | Krichtafovitch | |
| 2014/0345463 A1 * | 11/2014 | Urata | B03C 3/08 96/21 |
| 2014/0373717 A1 | 12/2014 | Wang | |
| 2015/0013541 A1 | 1/2015 | Vandenbelt et al. | |
| 2015/0059580 A1 * | 3/2015 | Clement | B03C 3/68 96/18 |
| 2015/0246595 A1 | 9/2015 | Forejt et al. | |
| 2015/0260147 A1 | 9/2015 | Schenk et al. | |
| 2015/0323217 A1 | 11/2015 | Krichtafovitch | |
| 2015/0343454 A1 | 12/2015 | Tyburk | |
| 2016/0013013 A1 | 1/2016 | Waddell | |
| 2016/0184834 A1 | 6/2016 | Genereux et al. | |
| 2016/0236205 A1 | 8/2016 | Seeley et al. | |
| 2017/0008008 A1 | 1/2017 | Umase | |
| 2017/0021363 A1 | 1/2017 | Krichtafovitch | |
| 2017/0072406 A1 | 3/2017 | Yamaguchi et al. | |
| 2017/0354977 A1 * | 12/2017 | Krichtafovitch | B03C 3/08 |
| 2017/0354979 A1 | 12/2017 | Krichtafovitch | |
| 2017/0354980 A1 | 12/2017 | Krichtafovitch | |
| 2017/0354981 A1 * | 12/2017 | Krichtafovitch | B01F 7/26 |

FOREIGN PATENT DOCUMENTS

| | | |
|---|---|---|
| CN | 201210251 | 3/2009 |
| CN | 100552854 | 10/2009 |
| CN | 101657247 B | 6/2013 |
| CN | 103706479 A | 4/2014 |
| CN | 105034756 A | 11/2015 |
| CN | 205066003 U | 3/2016 |
| DE | 1114935 A1 | 11/1991 |
| EP | 0332624 B1 | 1/1992 |
| EP | 2700452 A2 | 2/2014 |
| GB | 1490315 A | 11/1977 |
| WO | 2010025811 A1 | 3/2010 |
| WO | 2012039826 A3 | 8/2012 |
| WO | 2013173528 A1 | 11/2013 |
| WO | 2015084112 A1 | 6/2015 |

OTHER PUBLICATIONS

Wen, T., Wang, H., Krichtofovich, I., Mamishev, A., Novel Electrodes of an Electrostatic Precipitator for Air Filtration, submitted to Journal of Electronics Nov. 12, 2014, Seattle, Washington.

* cited by examiner

ELECTROSTATIC PRECIPITATOR

BACKGROUND OF THE INVENTION

1. Field of the Invention

The present invention relates to an electrostatic precipitator and more particularly to an electrostatic precipitator and control system.

2. Description of the Related Technology

U.S. patent application Ser. No. 14/401,082 entitled "Electronic Air Cleaners and Associated Systems and Methods" shows an electrostatic air cleaner collecting electrodes which carry a collection media, in particular, an open-cell structure that has been used to collect and remove particles such as dust, pollen, smoke, pathogens, and other contaminants from air by use of electric corona discharge, charging and collection components.

U.S. Ser. No. 14/401,802 shows an air cleaner that has an air cleaner that has an ionizing stage with exciting and corona electrodes and a collection stage with collecting and repelling electrodes. When a corona electrode is operated in an environment that includes certain chemicals, such as silicone, the electrodes may accumulate chemical particles which reduce performance and require that the electrodes be cleaned or replaced from time to time. J. H. Davidson, P. J. McKinney. Chemical Vapor Deposition in the corona discharge of electrostatic air cleaners. Journal of Electrostatics. 29(2): 102-110, 1998.

SUMMARY OF THE INVENTION

The electrostatic device described herein may be used as an electrostatic air cleaner and/or particle separator. It is an object to deliver air with predetermined air quality with changing intake air contamination level and air volume while maintaining optimum power consumption. Accordingly, an object is to improve energy consumption while optimizing the cleaning or separation efficiency.

It is an object to provide an electrostatic air cleaner that may be controlled to provide indoor (post-cleaner) air that has a specified level of contamination at a reduced power consumption.

It is an object to provide an electrostatic particle separator which may have the capacity to remove particles from an airflow and sort the particles by size.

It is an object to be able to rapidly change the voltage across the corona electrodes and across the repelling electrodes.

It is an object of the invention to extend the time between cleaning and/or replacement of the corona electrodes in an electrostatic air cleaner. This may be accomplished by reduction of the corona electrode voltage at times where the air quality requirements can met using a reduced corona voltage.

An electrostatic precipitator (ESP) is a filtration device that removes particles, like dust and smoke, from a flowing gas using the force of an induced electrostatic charge minimally impeding the flow of gases through the device. Electrostatic precipitators may be used as air filters, purifiers, and/or conditioners. An electrostatic precipitator may have several types of electrodes. One type of electrode is a corona electrode. Another type may be collecting electrodes. There may be other types of electrodes such as an exciting electrode and a repelling electrodes. Each type of electrode referred to herein may be a single electrode or plural electrodes. Typically electrodes of the same type of kept at the same potential. The exciting electrode may be a single piece structure or more than one piece electrically connected to each other. The corona electrodes may be a corona wire routed across the air flow path one time or more than one time and an electrostatic device may have one corona wire or multiple corona wires routed across an airflow path and electrically connected to each other. The term "electrode set" is intended to include one or more electrodes of the same type. Electrode sets may be mounted such that one or more electrodes sets may be removable to facilitate cleaning and/or replacement.

Air quality targets may vary depending on many factors. Maximum power usage is not necessarily needed in order to attain the required indoor air quality. The air quality output may be varied based on operating parameters.

At a lower velocity, the voltages on both the corona electrode and the repelling electrode may be lower than at higher air velocity. The air cleaning efficiency of the electrostatic air cleaner may depend on the air velocity. The higher the air velocity, the lower the air cleaning efficiency. Higher cleaning efficiency may be achieved by increasing either the corona electrode voltage or the repelling electrode voltage, or both.

If outdoor air is comparatively clean, indoor air quality levels may be attained at a lower filtration efficiency.

Large particles may be easier to collect (i.e., to remove from the air stream) than smaller particles. Therefore, with lower voltages on the corona or the repelling electrodes, a greater amount of large particles remain in the post-cleaner (post-particle separator) air stream than with higher voltages on the above electrodes. The voltage on the electrodes and power consumption of the electrodes may be adjusted to an optimum, not necessarily the maximum, level. Some industries like pharmaceuticals or bio-science environments where particles which may constitute pathogens or unwanted contamination are to be separated based on particle size range. This will allow separation efficiency control and control of particle size range separation in changing environments.

In an electrostatic precipitator, the corona electric power as well as the collecting electrode voltage is increased or decreased depending on the treatment amount and level of air contamination to be treated.

More specifically, the electrostatic air cleaner and particle separator may have a corona electrode for generating a stream of ions between the corona electrode and an exciting electrode facing the corona electrode. An electric power supply may apply voltages to both the corona electrodes and repelling electrodes. A collector section may include a set of the plate-like collecting electrodes and a set of plate-like repelling electrode. An air blower may be provided to create air flow in the device. The electrostatic air cleaner may have a particle separator function and may be capable of collecting or separating incoming particles. Another characteristic of the electrostatic air cleaner and particle separator is that it may include a power supply control component for increasing or decreasing the voltages on the above electrodes depending on the air volume of the air blower, air contamination, and resulting air purity or particle content level.

An electric power supply may impose a sufficient voltage differential between a corona electrode and a cooperating electrode to generate a coronal discharge. As a result, a stream of ions is generated. The ions may attach to particles contained in the air stream. The combined ions and particles are electrically charged. The charged components may flow with the air stream from an ionizing section toward the collection section where they may be attracted to and collected on collecting electrodes. Collection efficiency is generally the proportion of specified particles removed from a stream. The collection (filtration) efficiency of an electrostatic precipitator depends primarily on inter alia four factors:

1. The corona electrode voltage (and power);
2. The repelling electrode voltage;
3. Air velocity; and
4. Particle sizes.

Bigger particles may collect more ions on their surface and may obtain greater electrical charge. Therefore, bigger particles are subjected to greater electrical (Columbic) force, which may urge the charged particles toward the collecting electrodes.

Smaller particles may collect fewer ions and are thus under lower electrical force. Such smaller particles have a greater chance of escaping and appear in post-cleaner (post-particles separator) air.

The electrostatic air cleaner may remove particles of all size ranges, albeit, with varying removal (collecting) efficiency.

Outdoor air having a high contamination level may require air volume (air velocity) to be set to the maximum level (say 500 ft./min), and for the voltages on the corona electrode and the repelling electrode be set to the maximum allowable level. The allowable level is the voltage close to the breakdown voltage of the air between electrodes. At such levels, the electrostatic air cleaner will consume maximal power and, because it is working close to the breakdown voltage level, it may produce sporadic electrical discharges like sparks or arcing.

For example, if the outdoor air is rather dirty (for example, during rush hour) and contains contaminants (particles weight per volume, i.e., pout) about 200 micrograms per cubic meter. To achieve a level, Pin, of indoor air of 2 micrograms per cubic meter the filtration efficiency Eff should be no less than $$\text{Eff}=(\text{Pout}-\text{Pin})/\text{Pout}=0.99 \tag{1}$$

In order to achieve that high filtration efficiency, corona discharge voltage is kept near the corona breakdown voltage. As described in the T. Wen article, high filtration efficiency requires high power consumption and a large collector plate area.

It has been found that at a different (better) air quality level, for example, such as in light traffic conditions, inlet air may contain fewer dust particles per cubic meter. In such conditions the filtration efficiency may be reduced to achieve the same acceptable outlet air quality. For example, relatively poorer inlet air quality may require a filtration efficiency of 99% and at a better inlet air quality the same outlet air quality may be obtained at a 98% filtration efficiency. To achieve this level of the filtration efficiency, the corona electrode voltage may be decreased somewhat, for example from a 4.8 kV level to a 4.1 kV level. Power consumption in one example may drop up to 83% and still achieve the same indoor air quality.

Filtration efficiency may be controlled by changing the voltage on the repelling electrode. The repelling electrode consumes much less energy than the corona electrodes and therefore the power supply for the voltage of the repelling electrode may be a lower inertia supply allowing the repelling electrode to be controlled by simpler and more cost efficient means than would be required for an electrode requiring greater power (for example, using a linear regulator).

The air flow rate through a precipitator may be adjusted by adjustment of a blower. An energy saving may be achieved by setting the blower to deliver less air volume. Generally filtration efficiency decreases when air flow rate is increased, however air flow rate may be dictated by factors other than filtration efficiency. With increased air velocity, the corona voltage on the corona and repelling electrode voltage may be required to increase to maintain efficiency. With a decreased air velocity, one or both voltages may be decreased and still maintain the same efficiency.

It is an object to provide a power control permitting rapid changes to the electrode voltage. Power control may be achieved by changing the voltage across the corona electrodes and/or the repelling electrodes. Changing voltage of the repelling electrodes may be effected more rapidly when a low inertia supply is utilized.

For better air quality control with rapidly changing conditions, voltage on the repelling electrode may follow the changing conditions quickly, while voltage on the corona electrodes follows this change at a slower pace (i.e., changes more slowly).

Another advantage of the design is the advanced control over contamination of the corona electrode. In operation, the corona electrode may be under high voltage and therefore may be subject to electrode contamination. During operation, chemicals, like silicon, may be deposited onto the corona electrodes, which decreases the electrostatic air cleaner's performance.

The rate of chemical deposition on the corona electrodes depends in part on the corona voltage. The deposition of such chemicals requires the cleaning or replacement of the corona electrodes once their performance drops. Due to this phenomenon, the corona electrode should be periodically cleaned or replaced.

Reducing the corona electrode voltage reduces deposits to the corona electrode and thus extends the time between cleaning or replacement.

An object is to have a low ozone generation at the corona discharge. This ozone generation may be reduced by the reduction of the corona voltage. This may be accomplished when the electrostatic precipitator works on lower voltage/power levels.

An electrostatic air cleaner may have an electrostatic precipitator having an air inlet, an air outlet and at least two electrode sets. At least one air quality sensor may be positioned to monitor precipitator outlet air quality. A control system may be connected to the sensors and a power source may be connected to at least two electrode sets and responsive to the control system wherein the control system may be connected to receive the signal from the sensor and adjust a voltage at a power source output. The control system may be connected to adjust the power source outputs to achieve an air quality goal at an improved energy expenditure.

The air quality sensor may be a particle size distribution sensor, a particle concentration sensor, and/or an air flow rate sensor. Exciting electrode(s) may be positioned to cooperate with a corona electrode set. The exciting electrode set may be grounded. One of the electrode sets may include a repelling electrode set. A collecting electrode set may be at or near ground potential. The power source may have a first output connected to a corona electrode and a second output connected to a repelling electrode. The power source output connected to the first set of electrodes is independent of the power source output connected to the second set of electrodes. The control system may be responsive to an elevation senor or an air flow rate sensor. The electrostatic precipitator may have an air flow generator connected to the power source. The air flow generator may be a fan. In a personal air cleaner, the air flow may be caused by a user breathing. The electrostatic air cleaner may be a particle separator.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Figure 1:
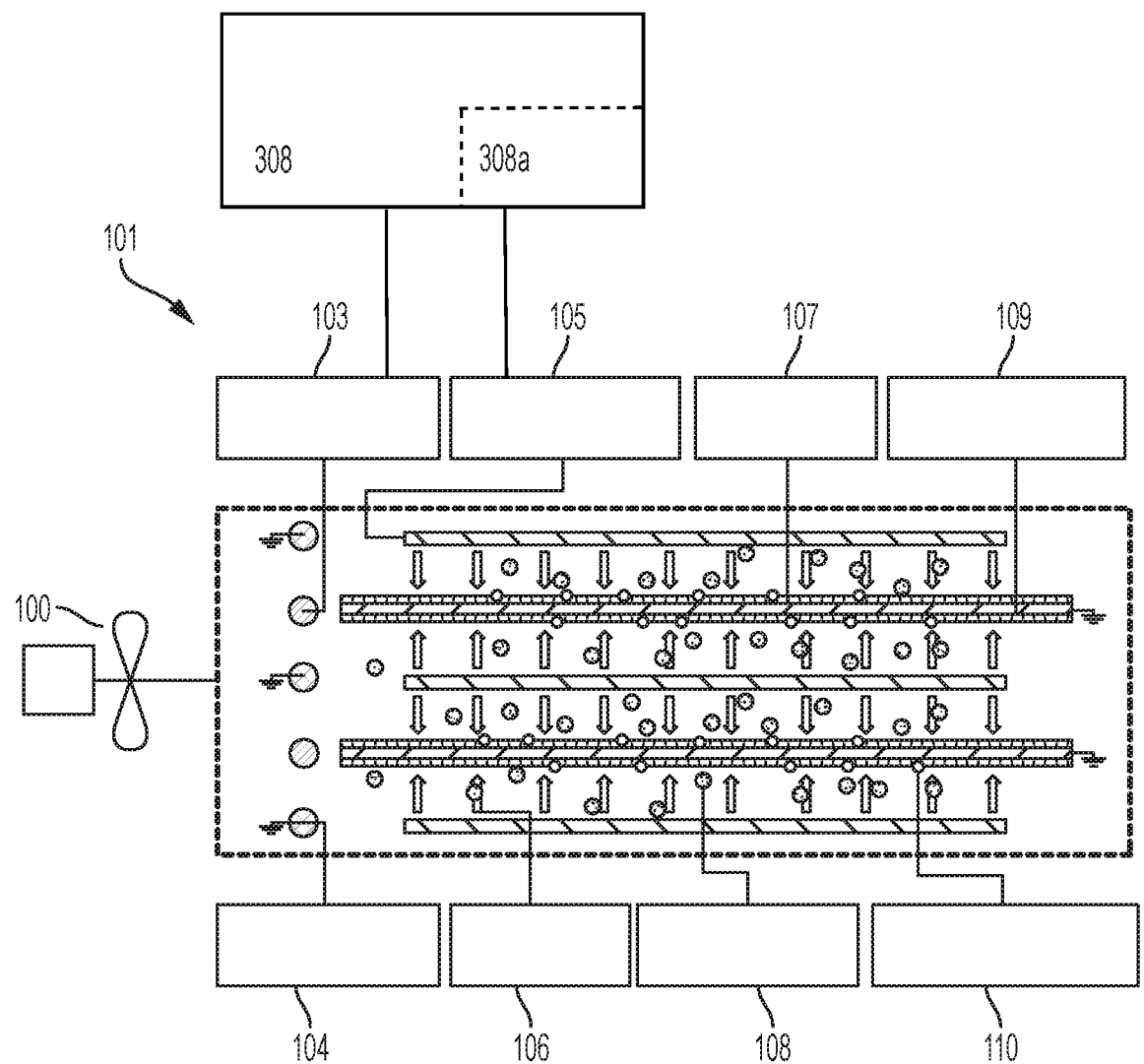
FIG. 1 shows a schematic illustration of the air mover and electrode structure of an electrostatic air cleaner.

FIG. 1 schematically shows an air mover 100 and the electrode geometry of an electrostatic precipitator stage 101 of an electrostatic air cleaning system. An ionizing stage may be provided in the intake air flow path. The ionizing stage may include one or more corona electrodes 103 which may be provided near an intake of the electrostatic precipitator stage 101. One or more exciting electrodes 104 may be provided near an intake of the electrostatic precipitator stage 101 and positioned to co-act with the corona electrodes 103. Repelling electrodes 105 may be located downstream from the ionization stage. In addition collecting electrodes 109 covered with porous, open-cell foam 107 may be located downstream from the exciting electrodes 104 and corona electrodes 103. The electrostatic precipitator may control actual air filtration efficiency in a wide range, from 30% to 99%, for particles of sizes from 0.3 to 5 microns. The filtration efficiency may be controlled by controlling the voltages on the corona electrode and the repelling electrode. These voltages may be kept within the range from zero to maximum voltage. The maximum voltage is determined by air breakdown voltage.

The air purification device shown in U.S. patent application Ser. No. 14/401,082 and the T. Wen article show devices with high voltages applied to both the corona electrode and the repelling electrode and show grounded exciting electrode(s) and collecting electrode(s). The device shown in FIG. 1 may have voltage applied to the corona electrodes 103 and repelling electrodes 105. The exciting electrodes 104 and collecting electrodes 109 may be grounded. Ionized particles 108 are subjected to forces, indicated by arrows 106 in FIG. 1. Particles 110 may settle on the open-cell collecting foam 107. All four electrode sets may have any electrical potential with regard to the ground, but the potential difference should be applied between the pairs of corona-exciting and repelling-collecting electrode sets in order to achieve maximum filtration or the required particles separation efficiency. At the same time, maximum voltage on the corona electrode set would require considerable electrical power usage. The electrostatic air cleaner 101 may include a fan 100 blowing air into the direction from the left to the right.

It has been found that collection efficiency varies based on particle size. Even when the operating parameters of an electrostatic precipitator are set for high efficiency, larger particles settle closer to the leading end of a collector and smaller particles settle progressively further from the leading end of a collector. In this way the collector may operate as a particle separator. With a low repelling electrode voltage the collection efficiency is also low. As the repelling electrode voltage increases so does the collection efficiency. The efficiency for large particles will reach a maximum at a relatively lower voltage and as voltage is increased the particle size subjected to maximal efficiency decreases.

Figure 2:
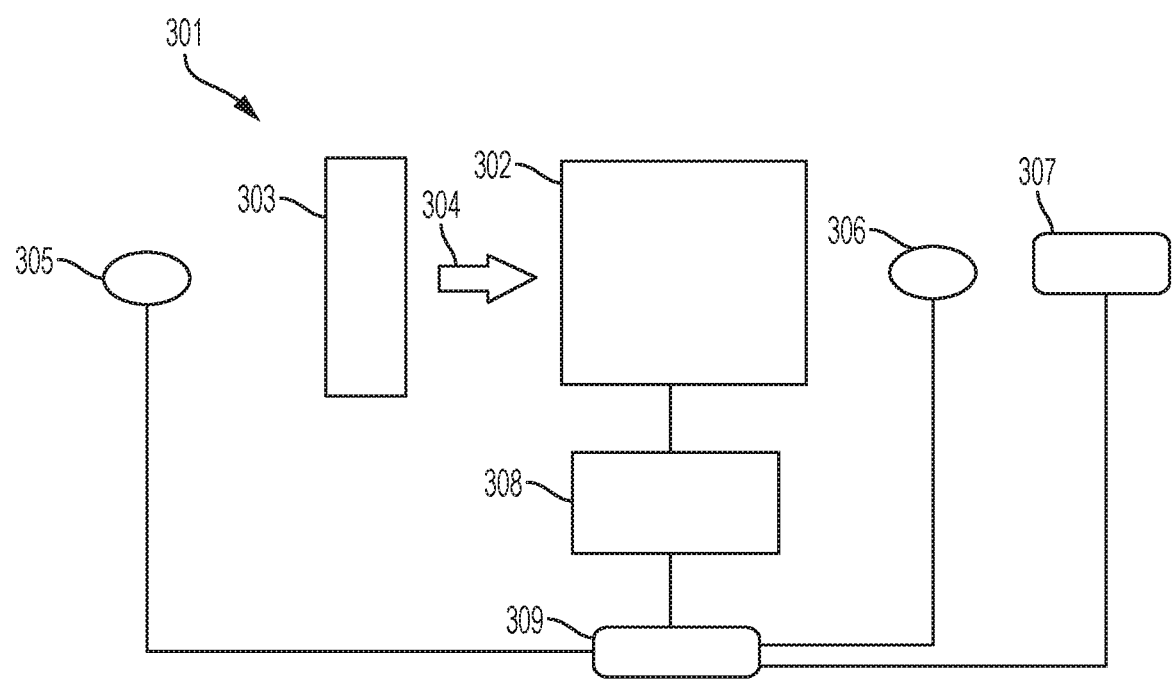
FIG. 2 shows a schematic illustration of an electrostatic air cleaner with a voltage control system responsive to air quality measurements.

FIG. 2 shows a schematic diagram of an electrostatic air cleaner with voltage controls responsive to air quality. The electrostatic air cleaner 301 may include a fan 303 blowing air into the direction shown by the arrow 304. The electrostatic air cleaner and particle separator section 302 clean incoming air. It may be powered by a power source 308 with a control system 309. Air quality monitors (sensors) 305 and 306 may monitor air quality and the condition of both outdoor and indoor air correspondingly. Sensor 307 may monitor the velocity of the air that passes through the particle separator section 302.

The power source 308 may generate high voltage that may be applied to the corona electrode 103 and to the repelling electrode 105 as shown in FIG. 1.

These voltages may be controlled separately (independently) or together depending on the specific requirements.

The electrostatic air cleaning device 301 may have maximum filtration efficiency when the voltages on both the repelling and the corona electrodes are set at the maximum level.

The fan 303 speed and incoming air quality may be related to collection performance.

The air velocity of incoming air provided to the air velocity monitor 307 and may be processed by the control system 309. The control system 309 may adjust voltage levels for the power source 308 and either increase or decrease voltages across the corona 103 and repelling 105 electrodes in order to achieve air quality requirements, filtration efficiency, or energy savings.

An air quality sensor 305 such as an Amphenol SM-PWM-01A SMART Dust Sensor or a Waveshare Dust Sensor Detector Module with Sharp GP2Y1010AU0F may be used.

Lowering the air velocity generated by the fan 303 permits the electrostatic air cleaner 301 to maintain necessary filtration efficiency at a reduced voltage. The air velocity monitor 307 may send a corresponding signal to the control system 309. The control system 309 may decrease the voltages generated by the power source 308 in accordance with either a pre-programmed value, a measured air quality level, or a required filtration efficiency. Air quality may be measured by the sensor 306, and the filtration efficiency is a result of a calculation in accordance with equation (1).

The control system may also use other environmental parameters including, but not limited to, elevation, air humidity, etc. Additional measures of environmental parameters or conditions allows for complicated and comprehensive power source 308 control via control system 309.

At high elevations, corona electrode voltage should be decreased in accordance with the Paschen law. In thinner air, the corona onset voltage and air breakdown voltage may be lower than at sea level. An additional air pressure monitor (not shown) may measure air pressure and send a corresponding signal to the control system 309.

The electrostatic air cleaner 301 may change its filtration efficiency due to other factors such as electrode contamination or other factors that cannot be readily predicted. In this case, the control system 309 may sense the difference in the filtration efficiency and change power source 308 output voltages to a level where the filtration efficiency is satisfactory. Filtration efficiency may be controlled by changing the voltage on the repelling electrodes. The repelling electrodes consume much less energy than the corona electrodes and therefore the power source may include a power supply 308a (FIG. 1) for the voltage of the repelling electrode which may be a lower inertia supply allowing the repelling electrode to be controlled by simpler and more cost efficient means than would be required for an electrode requiring greater power (for example, using a linear regulator).

The air cleaner 301 may be installed as a recirculating air cleaner having its air inlet and air outlet in a closed space, like a building or residence or an exterior intake system having an outdoor air inlet and an air outlet inside a closed space like a building or other enclosure. The particular air quality requirements and installation will inform the operation of the control system 309.

The techniques, processes and apparatus described may be utilized to control operation of any device and conserve use of resources based on conditions detected or applicable to the device.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of controlling electrostatic air cleaners have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An electrostatic air cleaner comprising:
   an electrostatic precipitator having an air inlet, an air outlet, a corona electrode set and a repelling electrode set;
   a collecting electrode set positioned to cooperate with said repelling electrode set;
   at least one air quality sensor positioned to monitor air quality;
   an adjustable high voltage power source connected to said corona electrode set and to said repelling electrode set;
   a control system connected to said adjustable high voltage power source to control adjustment of said adjustable high voltage power source, wherein said control system is connected to said at least one air quality sensor and said control system has a configuration to adjust said adjustable high voltage power source to achieve an air quality goal at an improved energy expenditure of said adjustable high voltage power source.

2. The electrostatic air cleaner according to claim 1 wherein said at least one air quality sensor is a particle size distribution sensor.

3. The electrostatic air cleaner according to claim 1 wherein said at least one air quality sensor is a particle concentration sensor.

4. The electrostatic air cleaner according to claim 1 wherein said at least one air quality sensor is an air flow rate sensor.

5. The electrostatic air cleaner according to claim 1 further comprising an exciting electrode set positioned to cooperate with said corona electrode set.

6. The electrostatic air cleaner according to claim 5 wherein said exciting electrode set is grounded.

7. The electrostatic air cleaner according to claim 1 further comprising an elevation sensor and wherein said control system is responsive to said elevation sensor.

8. The electrostatic air cleaner according to claim 1 wherein said electrostatic air cleaner is a particle separator.

9. The electrostatic air cleaner according to claim 1 wherein said collecting electrode set is at or near ground potential.

10. The electrostatic air cleaner according to claim 9 wherein said adjustable high voltage power source further comprises a first power source connected to said corona electrode set and a second power source connected to said repelling electrode set.

11. The electrostatic air cleaner according to claim 10 wherein said first power source is independent of said second power source and wherein said control system is configured to control said first power source differently than said second power source output.

12. The electrostatic air cleaner according to claim 11 wherein said second power source has a lower inertia than said first power source.

13. The electrostatic air cleaner according to claim 1 further comprising an air flow rate sensor and wherein said control system is responsive to said air flow rate sensor.

14. The electrostatic air cleaner according to claim 13 further comprising an air flow generator connected to said adjustable high voltage power source.

\* \* \* \* \*